July 25, 1939.  W. V. VIETTI  2,167,190

METHOD OF SCREENING WELLS

Filed May 29, 1937

WILLIAM V. VIETTI
INVENTOR

BY R. J. Dearborn
ATTORNEY

Patented July 25, 1939

2,167,190

UNITED STATES PATENT OFFICE 2,167,190

METHOD OF SCREENING WELLS

William V. Vietti, Houston, Tex., assignor to The Texas Company, New York, N. Y., a corporation of Delaware Application May 29, 1937, Serial No. 145,561

3 Claims. (Cl. 166—21)

This invention relates to a method of screening wells and more particularly to a method of placing a filter bed of gravel, coarse sand, carborundum or other granular abrasion-resisting material around the usual metal screen at the bottom of an oil well. The principal object of the invention is to provide such a method which will not necessitate the use of additional or unusual equipment and through the use of which a relatively coarse screen can be utilized.

In completing an oil well, particularly in loose or sandy formations, it is customary to set a fine screen of perforated steel or wire mesh in the producing stratum so as to permit of the production of the oil without producing the fine sand or silt which would otherwise accompany the oil and cause damage to the oil well and to the equipment. Because of the extreme fineness of this sand and silt it is necessary to use screens which have very small openings and, in practice, these openings quickly become clogged and satisfactory separation of the oil from the sand and silt is consequently prevented. Furthermore, the fine sand and silt by their abrasive action may cut holes in the screen, thus resulting in a sanding up of the well. As a result it is difficult, if not impossible, to remove all the oil from the oil-bearing formation.

In accordance with the invention, the usual screen is surrounded by coarse sand, gravel or other suitable materials, this constituting a filter bed through which the oil must flow before entering the flow string or tubing. The sand or gravel acting as a filter will, of course, permit the use of a coarser well screen. The coarse sand or gravel is suspended in a liquid, preferably oil, which is passed downwardly between the casing and the tubing, and when this filter material reaches the bottom of the hole the back pressure or clean-out valve is closed and the liquid then being forced to enter the tubing through the screen deposits the filter material around the outer surface of the screen, thus forming an efficient filter bed. After sufficient sand or gravel has collected around the screen the usual packer is sealed in the proper position, sealing the tubing from the casing and the well is then ready to be brought in.

Figure 1:
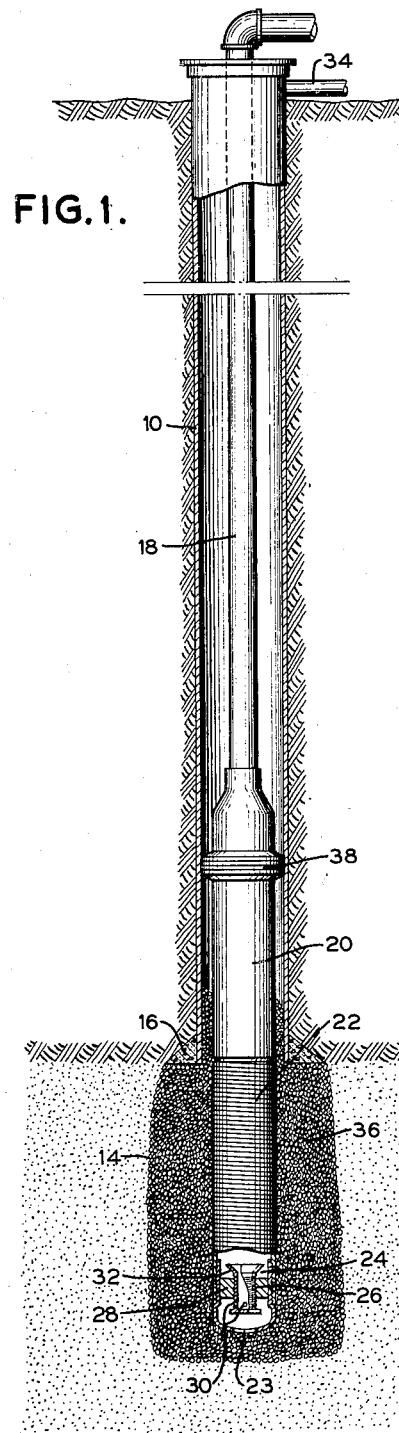
Figure 2:
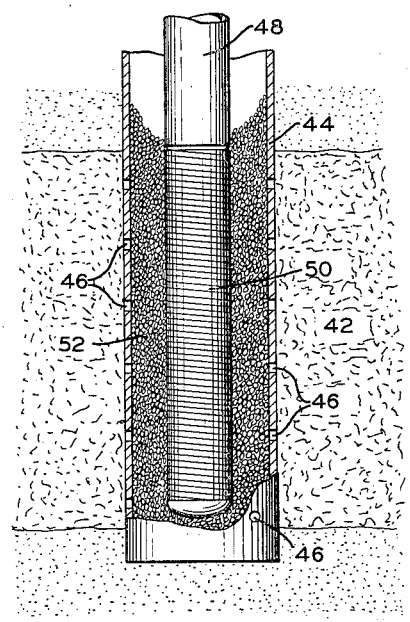
Figure 3:
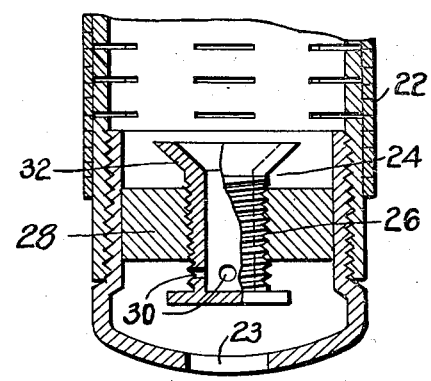

For a better understanding of the invention, reference may be had to the accompanying drawing, in which Figure 1 is a more or less diagrammatic representation of a vertical section through a well in which the method to be described can be carried out; Figure 2 illustrates a slightly modified method, while Figure 3 is an enlarged vertical sectional view showing the lower end of the well screen.

Referring to the drawing: A well casing 10 is shown in position in a well which has been drilled down to an oil sand or producing stratum 12. The hole may, if desired, be underreamed, as shown at 14, and the casing or casing shoe is set in cement 16 in the usual manner. A flow or tubing string 18 has attached at its lower end a liner 20, the lower portion of this liner being shown as comprising a screen 2. Obviously, a separate screen can be attached either to the tubing 18 or the liner 20 if necessary and, although the screen 22 is shown as of the wire-wrapped type, this may take other forms such as a perforated cylinder. The lower end of the screen is provided with an opening 23 forming a by-pass into the interior of the screen and tubing string. A valve 24, such as is commonly used to allow fluid to pass out from the tubing to clean the well, is shown disposed in the lower portion of the screen, this valve preferably being of a type which can be actuated from the surface to open or close the by-pass into the screen. As shown, the valve comprises a cylinder 26 closed at its lower end and having a threaded connection with a ring 28 secured to the screen wall. The cylinder 26 is provided with ports 30 and a flared upper end 32 adapted to be engaged by a tool lowered from the surface. The valve is shown in its open position and by rotating the cylinder 26 in a direction to move it upwardly the ports 30 will be closed off by the ring 28.

After the screen 22 has been placed in position at the bottom of the hole, oil in which a quantity of coarse sand or gravel or other like material has been suspended is pumped into the casing through a suitable pipe connection 34, during which time the valve 24 remains open allowing the fluid ahead of the filter material to pass around the screen and into the tubing through the ports 30. The valve 24 is closed about the time it is estimated that the oil containing the sand or gravel in suspension reaches the screen 22, and after a predetermined amount of the filter material 36 has been forced into the bottom of the hole, a suitable packer 38 is sealed in position between the liner 20 and the casing 10 and the well is ready to be brought in. The sand or gravel suspended in the oil being coarser than the openings in the screen 22 will collect around the outer surface of the screen, thus forming a filter bed through which the oil must pass in entering the liner 20. The oil in which the coarse sand or gravel was suspended passes freely through the openings in the screen and passes upwardly to the surface through the tubing 18. It will thus be seen that because of the filter bed around the screen, the screen openings may be considerably larger than those which have been used in the past, since the fine sand or silt will be held in the filter and will not find its way into the liner and tubing.

In certain locations it may be found advisable to follow a slightly different procedure and Figure 2 shows the bottom of a well which has been drilled through a producing formation 42. The casing 44 is run to the bottom of the well and cemented in place in the usual manner. That portion of the casing within the producing formation is then perforated as at 46 by any suitable means such as a gun perforator, and a string of tubing 48 having at its lower end a screen 50 is lowered within the casing substantially to the bottom of the well. The space between the screen 50 and the perforated portion of the casing is then packed with coarse sand or gravel or other filter material in the manner described with reference to the embodiment disclosed in Figure 1, i. e., a liquid such as oil containing the filter material in suspension is forced downwardly between the casing and the tubing, the filter material collecting in and forming a filter bed 52 between the screen and the casing. The filter bed is particularly advantageous in completing a well where the casing has been perforated since otherwise the jet action of the oil in entering the casing through the perforations 46 would cut holes in the screen in a short time. With the filter bed in use the filter material holds back fine sand and silt carried through the perforations 46 while the oil passes freely through the screen into the tubing.

Obviously many modifications and variations of the invention, as hereinbefore set forth, may be made without departing from the spirit and scope thereof, and therefore only such limitations should be imposed as are indicated in the appended claims.

I claim:

1. The method of completing an oil well provided with a casing, a string of tubing within said casing and a relatively coarse metal screen at the bottom end of said tubing, said screen having a by-pass at its lower end, which comprises pumping oil containing gravel in suspension downwardly between the casing and the tubing while maintaining the by-pass open, closing the by-pass when the oil containing the gravel reaches the well screen, whereupon the gravel is deposited around the screen, forcing the oil through the screen into the tubing and sealing the lower end of the casing from the tubing.

2. The method of graveling a well provided with a casing extending downwardly through a producing formation and having a perforated section opposite said formation, which comprises the steps of positioning in the well hole a string of tubing having a screen at its lower end, locating the screen opposite said producing formation and within the perforated section of said casing, forcing a carrier liquid containing a filter material in suspension downwardly through the anular space between the casing and the tubing, and depositing the filter material in the space between said screen and the perforated section of casing to form a filter bed through which the oil entering the casing through the perforations must pass before entering the tubing through the screen, the carrier liquid passing into the screen and upwardly to the surface through said tubing string.

3. The method of graveling a well provided with a casing, a tubing string within said casing and a perforated screen member at the lower end of said tubing, said screen member having a relatively large opening near its lower end, which comprises pumping a mixture of a liquid and a granular material downwardly through the annular space between the casing and the tubing string while maintaining said opening open, and closing said opening before said mixture passes therethrough into the screen member so that the granular material will be separated from the liquid and deposited around the screen while the liquid will enter through the screen perforations and pass upwardly to the surface through the tubing string.

WILLIAM V. VIETTI.